United States Patent [19]

El Tawil et al.

[11] Patent Number: 4,985,216

[45] Date of Patent: Jan. 15, 1991

[54] REDUCTION ROASTING OF METAL ORES

[75] Inventors: Mamdouh M. El Tawil, Belle Mead; Adrian E. Albrethsen, Bridgewater, both of N.J.

[73] Assignee: ASARCO Incorporated, New York, N.Y.

[21] Appl. No.: 222,336

[22] Filed: Jul. 20, 1988

Related U.S. Application Data

[63] Continuation of Ser. No. 701,715, Feb. 14, 1985, abandoned.

[51] Int. Cl.$^5$ .................. C01G 5/00; C01G 45/02; C22B 3/12; C22B 11/08
[52] U.S. Cl. ............................ 423/29; 75/419; 423/49
[58] Field of Search .............. 75/1 R, 84, 89, 101 R, 75/105, 118 R, 419, 427, 625, 636, 744; 423/29, 49, DIG. 4

[56] References Cited

U.S. PATENT DOCUMENTS

| | | | |
|---|---|---|---|
| 1,232,216 | 7/1917 | Caron | 75/105 |
| 3,929,468 | 12/1975 | Siemens et al. | 423/DIG. 4 |
| 3,997,333 | 12/1976 | Fey | 75/21 |
| 4,029,498 | 6/1977 | Okajima | 75/21 |

OTHER PUBLICATIONS

Rose, Arthur and Elizabeth, *Condensed Chemical Dictionary*, 5th Ed., Reinhold Pub. Co., New York, 1956, p. 759.

G. H. Clevenger, and M. H. Caron, "The Treatment of Manganese-Silver Ores", published by Dept. of Interior, Bureau of Mines, #226.

Chase, C. K. et al, Treatment of Manganiferous Silver Ores for Recovery of Silver in View of Changed Precious Metal Economics, from 110th AIME Meeting in Chicago, Ill., Feb. 22-26, 1981.

*Primary Examiner*—Jeffrey E. Russel
*Attorney, Agent, or Firm*—John J. Tomaszewski; Kenneth A. Koch

[57] ABSTRACT

A process is provided for the reduction roasting of ores using a $C_2$ to $C_8$ hydrocarbon. The process is particularly applicable to manganese dioxide containing ores and provides enhanced reduction of the manganese to lower oxidation states at low operating temperatures for manganese dioxide ores and provides increased silver recoveries from refractory manganese-silver ores.

4 Claims, No Drawings

REDUCTION ROASTING OF METAL ORES

This is a continuation of co-pending application Ser. No. 701,715 filed on Feb. 14, 1985, now abandoned.

BACKGROUND OF THE INVENTION

This invention relates to an improved method for the treatment of ores to enhance the recovery of metals by hydrometallurgical processes and, in particular, to the recovery of silver from manganese-silver ores by reduction roasting followed by cyanide leaching.

The recovery of metals from ores is an important industrial process and is practiced following a number of diverse procedures depending mainly on the nature of the ore. In many cases extraction of the metal is obtained by concentrating the ores followed by pyrometallurgical techniques in which intense heat is used to convert the metal mineral into the metal. In other extraction processes the desired metal is preferentially leached from the ore and then recovered from the leachant solution. Many of the ores are not directly leachable or are refractory however, and they must first be treated to increase the leachability of the metals. Throughout this specification and claims, the term "ore" is intended to include concentrates, tailings and other metalliferous matter as well as raw ores.

A particular well-known process is the treatment of manganese containing ores to increase the recovery of manganese by acid dissolution and the treatment of manganese-precious metal refractory ores to increase the recovery of the precious metal, e.g., silver, by cyanide leaching of the reduced ore and, for convenience, the following description will be directed to manganese containing ores but it will be appreciated by those skilled in the art that other ores may be similarly treated.

Regarding the recovery of silver from manganese-silver refractory ores, this process has presented many problems to the art over the years. Early work was performed by G. H. Clevenger and M. H. Caron and summarized in "The Treatment of Manganese-Silver Ores" published by the Department of the Interior, Bureau of Mines, 1925, Bulletin 226. U.S. Pat. No. 1,232,216 issued to Caron discloses the need for reduction roasting of the ore before cyanidation. As theorized by Caron, the low silver extraction is due to the presence of manganese dioxide in contact with the silver particles preventing normal action of the cyanide solution on the silver particles. Caron shows reduction of the ore using CO, or other reductants. A summary entitled "Treatment of Manganiferous Silver Ores for Recovery of Silver in View of Changed Precious Metal Ecomonics" by C. K. Chase is presented in the Proceedings from the 110th AIME Meeting in Chicago, Ill., Feb. 22-26, 1981. U.S. Pat. No. 1,562,942 shows roasting of the ore with pyrite or with other sulfides or sulfur. U.S. Pat. No. 1,864,222 utilizes solid carbon as the reductant and U.S. Pat. No. 2,759,809 reduces the ore by heating cellulosic materials such as wood with the ore in the absence of air. U.S. Pat. No. 2,867,529 has a preliminary roasting operation in an inert atmosphere or in an atmosphere deficient in oxygen followed by oxidation in an aqueous acid solution. A process for the direct cooling of reduced manganese ore without significant reoxidation is disclosed in U.S. Pat. No. 3,932,945.

Other alternatives to reduction roasting are hydrometallurgical in nature as shown in U.S. Pat. Nos. 2,829,045; 2,839,387; 2,884,322 and 4,421,724 and basically relate to extracting the ore with chemicals such as nitrites, amines and organic phosphoric acids either alone or in combination with cyanidation. U.S. Pat. Nos. 1,327,974 and 1,417,153 disclose mixing pulverized ore and pyrite or iron with $H_2SO_4$ to reduce the manganese. U.S. Pat. No. 2,777,764 shows a precyanidation treatment procedure utilizing a nonalkaline oxidizing medium such as $H_2SO_4$ under pressure at high temperature and T104,001 shows oxidizing comminuted ore under pressure at an elevated temperature.

The separation of manganese from manganese dioxide containing ores has also presented similar problems. In general, the ore is first reduced from $MnO_2$ to $MnO$ with reducing agents such as pulverized coal or heavy oil in rotary kilns or with natural gas or hydrogen by pile roasting at about 700-900° C. After the reduction, the ore is cooled in a nonoxidizing atmosphere, e.g., inert or reducing, to prevent spontaneous reoxidation of the $MnO$ and is then leached or dissolved with $H_2SO_4$ to separate the manganese for purification.

The above patents and references, the disclosures of which are hereby incorporated by reference, still do not provide an efficient method for the treatment of ores and in particular to the enhanced recovery of manganese from manganese dioxide ores or to the recovery of silver from refractory ores however, and the need exists for an improved process to provide high yields.

SUMMARY OF THE INVENTION

It has been discovered that the prior art method of pretreating ores by reduction roasting at an elevated temperature to increase the recovery of the metal by hydrometallurgical methods is improved by employing as the reductant a saturated or unsaturated, substituted or unsubstituted, hydrocarbon having at least 2 carbon atoms to about 8 carbon atoms and which is a gas at the roasting temperature. Ethane, propane and butane are the preferred hydrocarbons because of their demonstrated effectiveness. Natural gas, containing about 95% methane, by volume, and kerosene were ineffective and significantly lower recoveries were obtained as shown hereinbelow.

DETAILED DESCRIPTION OF THE INVENTION

The precious metal containing ores which may be treated using the process of the invention are refractory to hydrometallurgical methods of treatment and may vary widely in composition. Manganese-silver ores generally contain the manganese in an oxide form along with one or more of impurities such as iron oxide, lead, zinc and copper compounds and silica with the proportions of the elements varying widely. Some ores, for example, range, in weight percent, about 40% to 90% $SiO_2$, 0.4% to 30% manganese, up to about 4% zinc, 3% lead and 0.3% copper, and up to about 75 ounces (oz.)/ton silver, although higher silver content ores and ores containing varying amounts and/or other materials may also be treated by the process.

The manganese dioxide nonprecious metal ores may also vary widely in composition and generally contain greater than 50%, e.g., 75%, $MnO_2$.

The particle size of the ore to be treated may vary widely and is usually less than about 6 inch, with a preferred size being less than about 2 inch, and most preferably less than about ¾ inch, e.g., ½ inch. In general, the smaller the average particle size of the ore, the faster the reduction rate of the process.

Operation of the reduction roasting process requires contact of the ore with the reduction gases at an elevated temperature for a sufficient time to reduce the $MnO_2$ content to the desired level or to enhance the recovery of the silver from the refractory ore by hydrometallurgical techniques. Any suitable type of reduction roasting apparatus and process may be employed such as a single or multiple-hearth furnace, fluidized bed reactor, shaft furnace or rotary furnace. An externally heated inclined rotary furnace is preferred with the reducing gases flowing counter-current to the ore flow.

In carrying out the invention, the ore is subjected for an effective time to elevated temperatures of about 300° to below the fusion temperature of the ore, say below about 1000° C., e.g., 800° C. A preferred range is about 400° to 750° C., and most preferably about 450° to 650° C., e.g., 550° C. Higher temperatures may decrease silver recoveries and are generally unecomonical and require the need for higher costing materials of construction. In general, longer residence (contact) times are required at lower temperatures and/or larger particle size and the residence time may vary from a few minutes to an hour, or more, e.g., 90 minutes or to several hours. For an average particle size of about minus ⅛ inch and a temperature of about 550° C., a residence time of about 5 to 40 minutes has proven to provide excellent results for refractory manganese-silver ores.

The reductant of the invention is a saturated or unsaturated, substituted or unsubstituted, hydrocarbon having at least 2 carbon atoms to about 8 carbon atoms and which is gaseous at the temperature of the reduction roasting process. Preferably, the reductant is selected from saturated $C_2$-$C_5$ hydrocarbons, particularly ethane, propane and butane. Mixtures of hydrocarbons can also be suitably employed, for example, liquefied petroleum gas (LPG). The reductant can be used in the pure form or alternatively, may contain amounts of impurities normally associated with the hydrocarbon. Higher hydrocarbons, such as kerosene, have proven to be ineffective; however, these hydrocarbons may be employed if the reaction conditions are such as to crack the hydrocarbons to lower chain molecules.

The amount of reductant employed may vary widely and is preferably above the stoichiometric amount necessary to reduce the manganese oxides to MnO. Control of the reductant concentration may be, e.g., by monitoring the exit gas composition and its relation to the silver recovery by subsequent cyanidation.

In a typical process, the ore is continually charged into the end of an inclined externally heated rotary furnace and is moved through to the other end by the rotary action and incline of the furnace. The furnace temperature is maintained at the desired temperature, e.g. 550° C., and the reductant is introduced continuously into the furnace, preferably countercurrent to the flow of the ore, and mixes with and reacts with the ore. The outlet reductant stream may be recycled to the furnace and is preferably purged of reaction by-products (e.g., $CO_2$, $H_2O$, etc.) continuously or, at least, intermittently, to maintain the desired concentration of reductant in the furnace to effect the reduction reaction. The outlet reductant stream may also be burned as fuel to heat, for example, the furnace or the ore. In a batch operation using a fixed amount of ore as described in the example, process monitoring of the carbon dioxide concentration in the effluent gas indicates the reduction reaction is essentially complete when the peak carbon dioxide concentration is reached.

Once the ore has been reduced it is important to cool the reduced ore to near room temperature, e.g., less than 100° C., without any significant amount of reoxidation since this usually decreases the recovery of the silver and decreases the recovery of manganese from manganese dioxide ores. Cooling of the ore may be done in any atmosphere which is nonoxidizing to the ore and the hot, reduced ore from the reducing furnace is typically fed into a cooling vessel controlled under an inert gas atmosphere. Any inert gas such as nitrogen may be employed. U.S. Pat. No. 3,932,945, supra, shows rapid cooling of hot reduced manganese ore by the application of a suitably controlled air quenching process and eliminates the need for an inert cooling gas. Cooling may also be performed by quenching the hot reduced ore in a bath such as an aqueous bath.

Recovery of the silver from the reduced ore may be accomplished by any of the well-known hydrometallurgical methods. The cyanide process is preferred and basically the process comprises comminuting the ore, mixing the ore with an aerated alkaline solution containing a low concentration of water soluble cyanide, separating the solution and recovering the silver. A typical cyanide leaching solution contains 5 grams/liter (g/l) NaCN and sufficient alkali to maintain the pH at a level of about 10 or higher. Procedures such as heap leaching may also be suitably employed. In a preferred embodiment to increase the silver recovery, the reduced ore is first leached with sulfuric acid to remove manganese. Other leachants besides cyanide include brine, thiourea, hypochlorite and thiosulfate. The leaching with sulfuric acid is similar to the leaching of MnO from reduced $MnO_2$ ore to form a manganese sulfate solution which is further treated to make electrolytic manganese dioxide.

In order to further illustrate the present invention, the following examples are set forth below. It will be understood that throughout the specification and claims, all parts and percentages are by weight and all temperatures in degrees centigrade unless otherwise specified.

EXAMPLE I

This example demonstrates the reduction roasting of manganese-silver ore and the need for employing as the reductant a hydrocarbon having at least two (2) carbon atoms to provide increased silver recovery by cyanide leaching.

The reactor is a 4-inch nominal diameter, 18-inch long Inconel tube fitted with detachable end flange-and-pipe assemblies and a thermocouple in the air space of the tube. With a flange off, 1 kilogram of the ore having a particle size less than 178 inch, was loaded into the reactor. The ore contains approximately, by weight, 14.5% manganese, 65% silica, 2.7% lead, 0.7% zinc, 0.2% copper and 18 oz./ton silver. The flange was then reattached and all joints sealed against leaks. The reactor was mounted horizontally within a clamshell furnace and a sprocket drive was installed for a 6 rpm rotation of the reactor. Nitrogen gas, at least 4 reactor volumes, was swept through the reactor to displace the air. The power to the furnace was turned on and the nitrogen stream replaced with the indicated reducing gas. The reducing gas was fed at a rate calculated to exceed the stoichiometric requirement of the $MnO_2$ content of the ore, assuming the reaction goes to completion producing MnO, $CO_2$ and $H_2O$. Typically about 55 minutes were required to raise the temperature to 550° C., and the reactor was maintained at the 550° C. temperature for 20 minutes. During the course of the reaction the exhaust gases were passed through a steam condenser and then tested for carbon dioxide using an Orsat analyzer. The exhaust gas measurement indicates the amount of carbon dioxide and unreacted reductant present in the gas. Temperature and carbon dioxide measurements were taken at regular intervals.

After the reaction was maintained at the 550° C. temperature for 20 minutes (about 75 total minutes from introduction of the reductant) the power was turned off and the clamshell furnace opened. The reductant supply was stopped and nitrogen was then fed into the reactor until the temperature was lowered to below about 100° C. The reduced ore was pulverized to minus 65 mesh using a BICO ceramic disc pulverizer and a 100 gram sample was transferred into a 1-gallon narrow-mouth glass bottle. Three hundred milliliters (300 mls.) of 5 grams/liter NaCN solution and 0.2 grams CaO were added to the bottle and the open bottle was rotated horizontally on a set of rolls for 48 hours. The pH of the cyanide solution was maintained at about 12 by lime additions. At the end of the 48 hours, the ore was filtered and the silver recovery determined.

The results of the tests are shown in TABLE I.

TABLE I

| REDUCTANT | Amount Used* (pounds/ton ore) | Silver Content (oz./ton) | | % Silver Recovery |
| --- | --- | --- | --- | --- |
| | | Cyanide Solution** | Residue | |
| Natural Gas | 30 | 12.59 | 5.52 | 69.5 |
| Ethane | 30 | 17.58 | 3.36 | 84.0 |
| Propane | 32 | 14.67 | 3.10 | 82.6 |
| Butane | 34 | 16.45 | 3.39 | 82.9 |

*Amount passed through the reactor after the reactor reached 350° C.
**Dissolved silver expressed as oz./ton of ore.

The above results show the enhanced silver recovery for ethane, propane and butane when compared with natural gas—the natural gas containing about 95% methane. The carbon dioxide measurements taken during the reaction show for each reductant a bell-shaped curve with peak carbon dioxide concentration at about 45 minutes indicating, based on previous tests, that the reduction reaction was essentially complete and no further reduction was occurring during the last 30 minutes. In other words, under the test conditions employed, the silver recovery was the maximum achievable for each of the reductants and natural gas had a significantly lower effect on the silver recovery than the ethane, propane and butane.

EXAMPLE II

Similar reduction roasts were performed as in EXAMPLE I comparing propane with carbon monoxide, coal and kerosene for a reaction time of 1 hour. Pulverized coal was thoroughly blended with the ore and the charge placed in the reactor and heated at the indicated time and temperature. Kerosene was evaluated by metering it into the reactor during the time period and it was vaporized before contacting the ore charge. Both coal and kerosene were run in the absence of air. The results are shown hereinbelow in TABLE II.

TABLE II

| REDUCTANT | Reaction Temperature (°C.) | % Silver Recovery |
| --- | --- | --- |
| Propane | 550 | 85.5 |
| CO | 550 | 21.3 |
| Coal | 800 | 37.0 |
| Kerosene | 800 | 14.6 |

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A substantially natural gas free reduction roasting method for recovering silver from a manganese oxide-silver ore containing, in weight percent, about 40% to 90% $SiO_2$, 0.4% to 30% manganese, and up to about 4% zinc, 3% lead, 0.3% copper and 75 ounces/ton silver comprising:
   (a) reacting the ore at a temperature about 300° to 800° C. for a sufficient time with a hydrocarbon which is predominately ethane, propane or butane to reduction roast the ore;
   (b) cooling the reacted ore under a nonoxidizing atmosphere; and
   (c) leaching the silver from the reacted ore with a cyanide leachant.

2. The method of claim 1 wherein the reaction time is up to about 90 minutes.

3. The method of claim 1 wherein the average particle size of the ore is less than about ¾ inch.

4. The method of claim 3 wherein the temperature is about 450° to 650° C.

* * * * *